Aug. 21, 1945.   J. F. SEBALD   2,383,086
WATER TREATING APPARATUS
Filed July 9, 1942   2 Sheets-Sheet 2
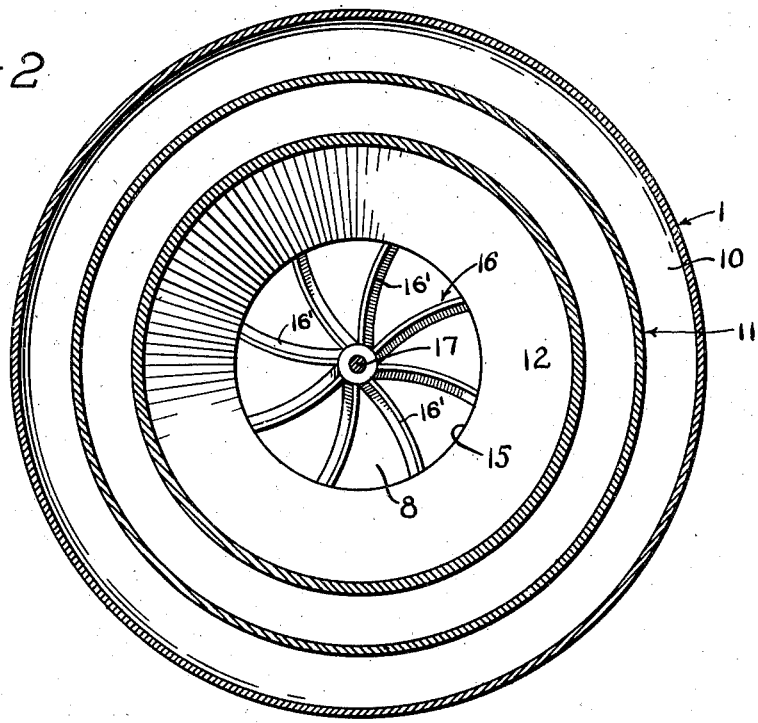
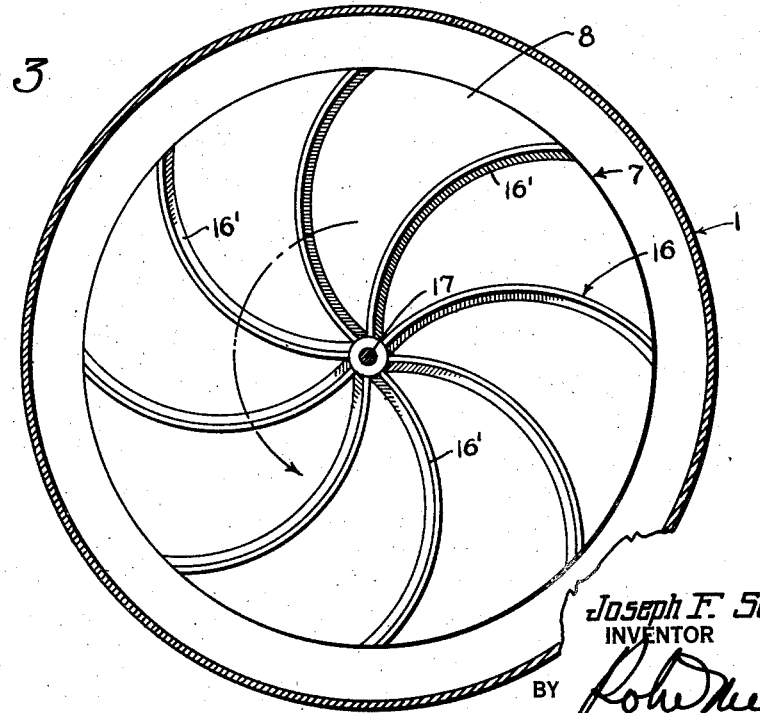
Joseph F. Sebald
INVENTOR
BY
ATTORNEY Patented Aug. 21, 1945

2,383,086

UNITED STATES PATENT OFFICE 2,383,086

WATER TREATING APPARATUS

Joseph F. Sebald, Bloomfield, N. J., assignor to Worthington Pump and Machinery Corporation, Harrison, N. J., a corporation of Delaware Application July 9, 1942, Serial No. 450,263

7 Claims. (Cl. 210—16)

This invention relates to water treating apparatus and more particularly to an improved cold process apparatus for softening, clarifying and purifying water.

The present invention embodies the advantages of the known fact that to add raw water and chemicals to a slurry containing previously precipitated particles improves and accelerates coagulation and purification and accelerates the chemical and physical changes involved in separating out the formed substances or solids. The newly formed solids deposit by accretion upon the particles present in the slurry rather than separating out as new small particles. These particles are relatively stable, being not readily subject to disintegration and of such nature that clear treated water is readily separated from the slurry.

An object of the present invention is to provide an apparatus operating on the principle as above outlined which is constructed and arranged to effectively treat a predetermined quantity of water in a predetermined length of time, the overall size of which apparatus is materially smaller than the over-all size of water treating apparatus of approved make now on the market having the same capacity per time interval.

Another object of the invention is to provide in a water treating apparatus as specified mechanical means for thoroughly mixing the incoming raw water and chemicals and means for recirculating a part of the slurry formed of partially treated water, chemicals and precipitated particles which latter means is arranged with respect to the raw water and chemical mixing means so as to provide a thorough mixing of the mixed raw water and chemicals with the recirculated slurry to hasten flocculation and the formation of precipitated particles in a filter bed above the mixing and recirculating zones.

With these and other objects in view as may appear from the accompanying drawings, the invention consists of various features of construction and combination of parts, which will be first described in connection with the accompanying drawings, showing a water treating apparatus of the preferred form embodying the invention, and the features forming the invention will be specifically pointed out in the claims.

In the drawings:

Figure 2 is a horizontal cross-section taken on the line 2—2 of Figure 1.

Figure 3 is a horizontal cross-section taken on the line 3—3 of Figure 1.

Figure 1:
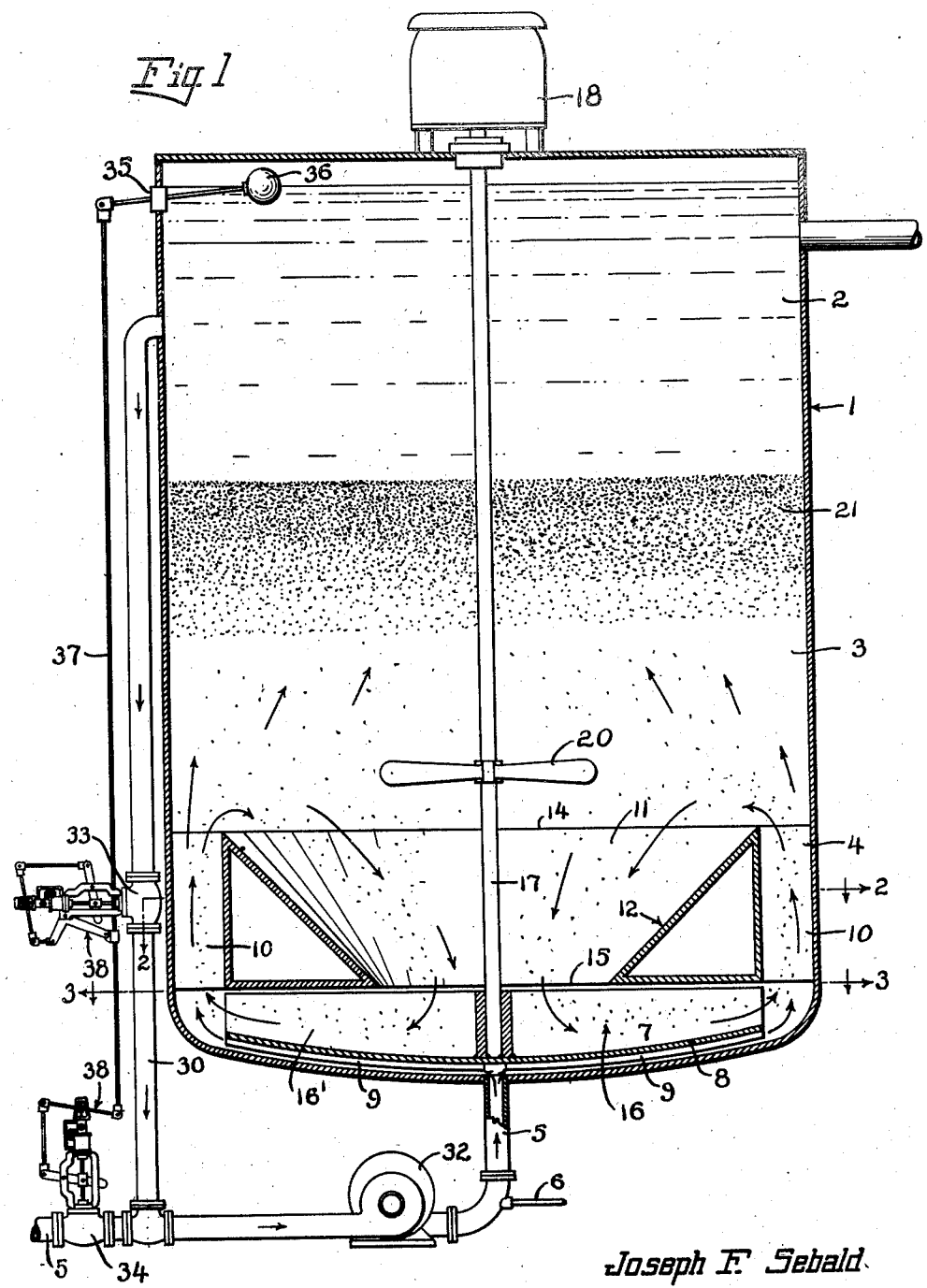
Figure 1 is a vertical section through the improved water treating apparatus.

Referring more particularly to the drawings the improved water treating apparatus comprises a treating receptacle or tank 1 comprising an upper storage or collection portion 2, intermediate separation or precipitation portion 3, and a mixing and recirculation portion 4. The raw water to be treated is delivered to the treating receptacle 1 from any suitable source (not shown) through a supply pipe 5 and enters the receptacle 1 at the bottom thereof. Treating chemicals are introduced into the incoming raw water through the chemical inlet 6.

When the incoming raw water and chemicals enter the receptacle 1 they are picked up by a mixing pump structure 7, including a carrier body 8 and a plurality of relatively narrow curved vanes 9 arranged so that the inlet to the mixing circulating pump structure is at the axis of rotation thereof, and are discharged from the perimeter into the vertically rising annular discharge passage 10 formed within the receptacle 1 by the passage forming means 11 of the recirculating mechanism of the water treating apparatus.

The water recirculating apparatus comprises the inlet or suction passage forming means 11 in the form of an annulus located concentric of the axis of the receptacle 1 in the lower part of the separation or precipitation portion of the receptacle 1, and it is provided with a passage having its entrance at the top and in the separation portion or precipitation space of the receptacle 1 with its outlet at the bottom. The passage 12 gradually decreases in cross-sectional area from its inlet 14 to its outlet 15, and it forms a passage for returning slurry constituting mixed raw water, chemicals and precipitation to the recirculator portion 16 of the pump structure 7. The recirculator portion 16 of the pump structure 7 comprises a plurality of curved vanes 16' rotating from the axis of the pump structure 7 which take the slurry from the suction passage 12 and discharge it into the rising discharge passage 10, where it is mixed with the incoming mixed raw water and chemicals.

The pump structure 7 is carried by a shaft 17, which is rotated by any suitable type of a prime mover 18.

As noted by reference to Figure 1 of the drawings, the recirculating vanes 16 are of considerably greater width and consequently of greater volumetric capacity than the mixing vanes 9, so that a greater quantity of slurry will be recirculated per given interval of time than the quantity of incoming raw water and chemicals which will be discharged by the impeller 9 in the same interval. Also the capacity of the recirculating impeller vane structure 16 is greater than the capacity of the receptacle 1, so that slurry will be recirculated through the mixing portion 4 a number of times. By varying the width or height of the vanes 16 the rate of recirculation of slurry may be varied and also the proportion of slurry recirculated relative to the raw water and chemicals delivered by the pump 9 may be varied.

An agitating propeller 20 is mounted on the shaft 17 for rotation in the separation portion or precipitation space of the receptacle 1 immediately above the entrance 14 of the suction passage 11.

The precipitated particles separated out in the separation portion or precipitation space 3 of the receptacle 1 collect in a flock bed 21 at the top of the separation or precipitation portion, and the treated water flows upwardly through the flock bed 21, emerging therefrom into the collection or storage portion 2 of the receptacle 1 in purified treated condition. The purified treated water is withdrawn from the collection or storage portion 2 to any desired point of use (not shown).

In the construction and design of water treating apparatus such as of the present invention, the apparatus is designed to perform most efficiently with a predetermined quantity of water passing therethrough, such predetermined quantity being based upon the maximum capacity of the apparatus. Reduction of the quantity of water passing through the treating apparatus tends to lower its efficiency and affect the proper treatment of the water. Therefore, for the purpose of maintaining operation of the treating apparatus at its maximum efficiency, irrespective of the load demand thereupon, i. e. whether the demand for treated water is for full capacity or much less than full capacity of the apparatus, means are provided for recirculating a part of the treated water from the collection or storage portion 2 through the treating apparatus, when the level of treated water in such storage or collection portion reaches or rises to a predetermined level, due to reduced demand.

The treated water recirculation mechanism comprises a pipe or connection 30 running from the storage or collection portion 2 and opening at its other end or outlet and into the raw water supply pipe 5 in advance of a pump 32 which is placed in the raw water pipe to insure delivery of raw water to the treating apparatus in the desired quantity and at the desired pressure. A valve 33 is interposed in the pipe 30 and a second valve 34 is interposed in the raw water supply pipe 5 forwardly of the connection of the pipe 30 to the pipe 5. A float valve structure, of any approved type, as shown at 35, is provided, in which the float 36 moves according to the variation in level of treated water in the storage or collection portion 2. The movement of the float 36 operates a rod 37, the latter being connected to the operating mechanism of the valves 33 and 34 by suitable linkage 38 so that said valves will be operated simultaneously but in reverse directions. That is, when the valve 33 is opened, the valve 34 will be closed, proportionately to the opening of the valve 33, and when the valve 33 is closed the valve 34 will be proportionately opened. Thus the quantity of purified, treated water removed from the storage or collection portion 2 regulates the quantity of raw water delivered to the treating apparatus, as well as regulating the quantity of treated water recirculated through the apparatus. In other words, the amount of raw water supplied to the apparatus is controlled by and is approximately equal to the amount of treated water withdrawn therefrom, and by the same means the quantity of treated water recirculated increases in inverse ratio to the quantity of raw water supplied or the quantity of treated water withdrawn. In this manner, a constant, equal volume of flow of water is maintained through the apparatus and maximum efficiency of operation thereof is obtained.

It will be understood that the invention is not to be limited to the specific construction or arrangement of parts shown, but that they may be widely modified within the invention defined by the claims.

What is claimed is:

1. In a water treating and purifying apparatus, a receptacle having an inlet for raw water at the center of the bottom thereof, said receptacle providing a storage space for treated water in its top portion and a precipitation space below the storage space in which precipitation space foreign matter is precipitated from the water, an outlet for treated water from said storage space, a passage forming member of annulose form in said receptacle between the inlet and the precipitation space and located concentrically of the vertical axis of the receptacle with its outer periphery spaced inwardly of the wall of the receptacle to form an annular mixing passage discharging into the precipitation space, a raw water pumping impeller in said receptacle and positioned to receive at its inlet incoming water from said raw water inlet and to discharge it into said annular mixing passage, a slurry recirculation impeller in said receptacle located to receive slurry constituting water and precipitate passing through said passage-forming member from said precipitation space and to discharge said slurry into said mixing passage for mixing with water discharged thereinto by said raw water impeller, and means for operating said impellers.

2. In a water treating and purifying apparatus, a receptacle having an inlet for raw water at the center of the bottom thereof, said receptacle providing a storage space for treated water in its top portion and a precipitation space below the storage space in which precipitation space foreign matter is precipitated from the water, an outlet for treated water from said storage space, a passage-forming member of annulose form in said receptacle between the inlet and the precipitation space and located concentrically of the vertical axis of the receptacle with its outer periphery spaced inwardly of the wall of the receptacle to form an annular mixing passage discharging into the precipitation space, an impeller structure in said receptacle below said passage-forming member, said impeller structure including a raw water pumping section having its inlet positioned to receive water from said raw water inlet and its discharge located to discharge the water into said mixing space, said impeller structure including a second pumping section having its inlet located to receive slurry from the passage formed by said passage-forming member and its discharge located to discharge the slurry into the mixing passage for mixing with raw water discharged into the mixing passage by said raw water pumping section, said slurry constituting water and precipitate passing from said precipitation space through the passage, and means for rotating said impeller structure.

3. In a water treating and purifying apparatus, a receptacle having an inlet for raw water at the center of the bottom thereof, said receptacle providing a storage space for treated water in its top portion and a precipitation space below the storage space in which precipitation space foreign matter is precipitated from the water, an outlet for treated water from said storage space, a passage-forming member of annulose form in said receptacle between the inlet and the precipitation space and located concentrically of the vertical axis of the receptacle with its outer periphery spaced inwardly of the wall of the receptacle to form an annular mixing passage discharging into the precipitation space, an impeller structure in said receptacle below said passage-forming member, said impeller structure including a raw water pumping section having its inlet positioned to receive water from said raw water inlet and its discharge located to discharge the water into said mixing space, said impeller structure including a second pumping section having its inlet located to receive slurry from the passage formed by said passage-forming member and its discharge located to discharge the slurry into the mixing passage for mixing with raw water discharged into the mixing passage by said raw water pumping section, said slurry constituting water and precipitate passing from said precipitation space through the passage, means for rotating said impeller structure, a conduit leading from said storage space to said raw water inlet for passing treated water from the storage space into the receptacle for recirculation therethrough, valves in said inlet and said conduit for controlling the flow of treated water and raw water to the receptacle, and means actuated by variances in the level of the water in said storage portion and operatively connected with said valves for actuating the valves reversely for regulating the relative amounts of raw and treated water delivered to said inlet.

4. In a water treating and purifying apparatus, a receptacle having an inlet for raw water at the center of the bottom thereof, said receptacle providing a storage space for treated water in its top portion and a precipitation space below the storage space in which precipitation space foreign matter is precipitated from the water, an outlet for treated water from said storage space, a passage-forming member of annulose form in said receptacle between the inlet and the precipitation space and located concentrically of the vertical axis of the receptacle with its outer periphery spaced inwardly of the wall of the receptacle to form an annular mixing passage discharging into the precipitation space, an impeller structure in said receptacle below said passage-forming member, said impeller structure including a raw water pumping section having its inlet positioned to receive water from said raw water inlet and its discharge located to discharge the water into said mixing space, said impeller structure including a second pumping section having its inlet located to receive slurry from the passage formed by said passage-forming member and its discharge located to discharge the slurry into the mixing passage for mixing with raw water discharged into the mixing passage by said raw water pumping section, said slurry constituting water and precipitate passing from said precipitation space through the passage, means for rotating said impeller structure; the pumping sections of said impeller structure being superposed one upon the other, and means separating the pumping sections to prevent mixing of the slurry and raw water prior to their entrance into the mixing passage.

5. In a water treating and purifying apparatus, a receptacle having an inlet for raw water at the center of the bottom thereof, said receptacle providing a storage space for treated water in its top portion and a precipitation space below the storage space in which precipitation space foreign matter is precipitated from the water, an outlet for treated water from said storage space, a passage-forming member of annulose form in said receptacle between the inlet and the precipitation space and located concentrically of the vertical axis of the receptacle with its outer periphery spaced inwardly of the wall of the receptacle to form an annular mixing passage discharging into the precipitation space, an impeller structure in said receptacle below said passage-forming member, said impeller structure including a raw water pumping section having its inlet positioned to receive water from said raw water inlet and its discharge located to discharge the water into said mixing space, said impeller structure including a second pumping section having its inlet located to receive slurry from the passage formed by said passage-forming member and its discharge located to discharge the slurry into the mixing passage for mixing with raw water discharged into the mixing passage by said raw water pumping section, said slurry constituting water and precipitate passing from said precipitation space through the passage, and means for rotating said impeller structure, said slurry pumping section of said impeller structure having a capacity considerably greater than the capacity of the receptacle whereby slurry will be recirculated through the mixing passage a number of times.

6. In a water treating and purifying apparatus, a receptacle having an inlet for raw water at the center of the bottom thereof, said receptacle providing a storage space for treated water in its top portion and a precipitation space below the storage space in which precipitation space foreign matter is precipitated from the water, an outlet for treated water from said storage space, a passage-forming member of annulose form in said receptacle between the inlet and the precipitation space and located concentrically of the vertical axis of the receptacle with its outer periphery spaced inwardly of the wall of the receptacle to form an annular mixing passage discharging into the precipitation space, an impeller structure in said receptacle below said passage-forming member, said impeller structure including a raw water pumping section having its inlet positioned to receive water from said raw water inlet and its discharge located to discharge the water into said mixing space, said impeller structure including a second pumping section having its inlet located to receive slurry from the passage formed by said passage-forming member and its discharge located to discharge the slurry into the mixing passage for mixing with raw water discharged into the mixing passage by said raw water pumping section, said slurry constituting water and precipitate passing from said precipitation space through the passage, means for rotating said impeller structure, said slurry pumping section of said impeller structure having a capacity considerably greater than the capacity of the raw water pumping section of the impeller whereby a greater quantity of slurry will be delivered to said mixing passage than the quantity of raw water delivered to the mixing passage in any predetermined time period.

7. In a water treating and purifying apparatus, a receptacle having an inlet for raw water at the center of the bottom thereof, said receptacle providing a storage space for treated water in its top portion and a precipitation space below the storage space in which precipitation space foreign matter is precipitated from the water, an outlet for treated water from said storage space, a passage-forming member of annulose form in said receptacle between the inlet and the precipitation space and located concentrically of the vertical axis of the receptacle with its outer periphery spaced inwardly of the wall of the receptacle to form an annular mixing passage discharging into the precipitation space, an impeller structure in said receptacle below said passage-forming member, said impeller structure including a raw water pumping section having its inlet positioned to receive water from said raw water inlet and its discharge located to discharge the water into said mixing space, said impeller structure including a second pumping section having its inlet located to receive slurry from the passage formed by said passage-forming member and its discharge located to discharge the slurry into the mixing passage for mixing with raw water discharged into the mixing passage by said raw water pumping section, said slurry constituting water and precipitate passing from said precipitation space through the passage, means for rotating said impeller structure, said slurry pumping section of said impeller structure having a capacity considerably greater than the capacity of the receptacle whereby slurry will be recirculated through the mixing passage a number of times, a conduit leading from said storage portion to said raw water inlet for passing treated water to the inlet for recirculation through the receptacle, valves in said inlet and said conduit for controlling the flow of treated water and raw water to the receptacle, and means actuated by variances in the level of treated water in said storage space and operatively connected to said valves for actuating the valves reversely for regulating the relative amounts of raw and treated water delivered to the receptacle.

JOSEPH F. SEBALD.